(12) United States Patent
Brown et al.

(10) Patent No.: US 6,289,871 B1
(45) Date of Patent: Sep. 18, 2001

(54) METHOD FOR ACHIEVING MINIMUM LIQUID PILOT FUEL DELIVERY TO EACH CYLINDER OF A DUAL FUEL ENGINE WHILE OPERATING IN A DUAL FUEL MODE

(75) Inventors: Scott C. Brown, Peoria; Jeffery T. Fischer, Brimfield, both of IL (US); Martin L. Willi, Lafayette, IN (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 09/036,045

(22) Filed: Mar. 6, 1998

(51) Int. Cl.$^7$ ....................................................... F02B 3/00
(52) U.S. Cl. ........................................... 123/299; 123/300
(58) Field of Search .................................. 123/299, 300, 123/435, 676

(56) References Cited

U.S. PATENT DOCUMENTS

| | | | |
|---|---|---|---|
| 4,597,364 | 7/1986 | Young | 123/27 GE |
| 4,641,625 | 2/1987 | Smith | 123/575 |
| 4,955,326 | 9/1990 | Helmich | 123/27 GE |
| 5,070,836 | * 12/1991 | Wahl et al. | 123/299 |
| 5,090,379 | * 2/1992 | Ito | 123/299 |
| 5,136,986 | 8/1992 | Jensen | 123/27 GE |
| 5,140,959 | 8/1992 | Durbin | 123/304 |
| 5,150,685 | 9/1992 | Porter et al. | 123/478 |
| 5,224,457 | 7/1993 | Arsenault et al. | 123/526 |
| 5,226,396 | 7/1993 | Bailey | 123/494 |
| 5,394,849 | * 3/1995 | Tomisawa | 123/435 |
| 5,398,724 | 3/1995 | Vars et al. | 137/625.33 |
| 5,450,829 | 9/1995 | Beck | 123/435 |
| 5,482,016 | * 1/1996 | Ohishi et al. | 123/299 |
| 5,526,786 | 6/1996 | Beck et al. | 123/357 |
| 5,718,203 | * 2/1998 | Shimada et al. | 123/435 |
| 5,881,693 | * 3/1999 | Mizuno | 123/435 |
| 5,884,602 | * 3/1999 | Friedrich et al. | 123/300 |

* cited by examiner

Primary Examiner—John Kwon

(57) ABSTRACT

A method for controlling and adjusting the delivery of liquid pilot fuel to each cylinder of a dual fuel engine during a dual fuel operating mode so as to both minimize the quantity of liquid pilot fuel being delivered to each individual cylinder while, at the same time, ensuring that such minimum quantity of liquid pilot fuel provides complete combustion performance within each such cylinder wherein certain cylinder performance parameters such as exhaust port temperature or cylinder pressure are evaluated on a per cylinder basis in order to determine cylinder performance. The present method establishes certain predetermined incremental changes in the selected cylinder performance parameters, which changes are indicative of poor or deteriorated combustion performance within any particular cylinder, and thereafter varies the amount of liquid pilot fuel delivered to such cylinder based upon an analysis and evaluation of changes occurring in the selected cylinder performance parameters. Although it is preferred that each cylinder be evaluated on an individual basis, it is recognized and anticipated that, in some applications, the present method may be used to control the delivery of liquid pilot fuel to two or more cylinders simultaneously.

20 Claims, 6 Drawing Sheets

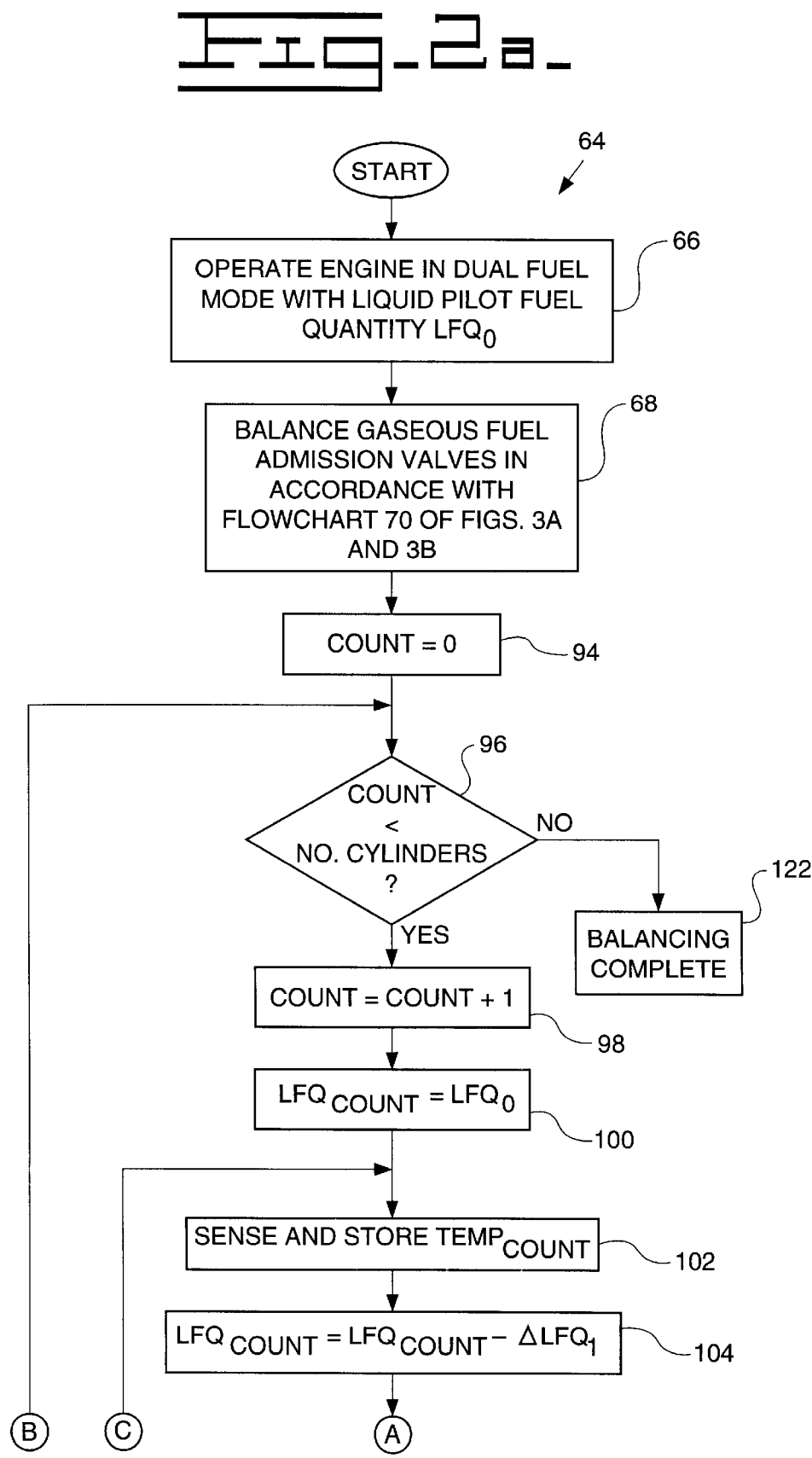

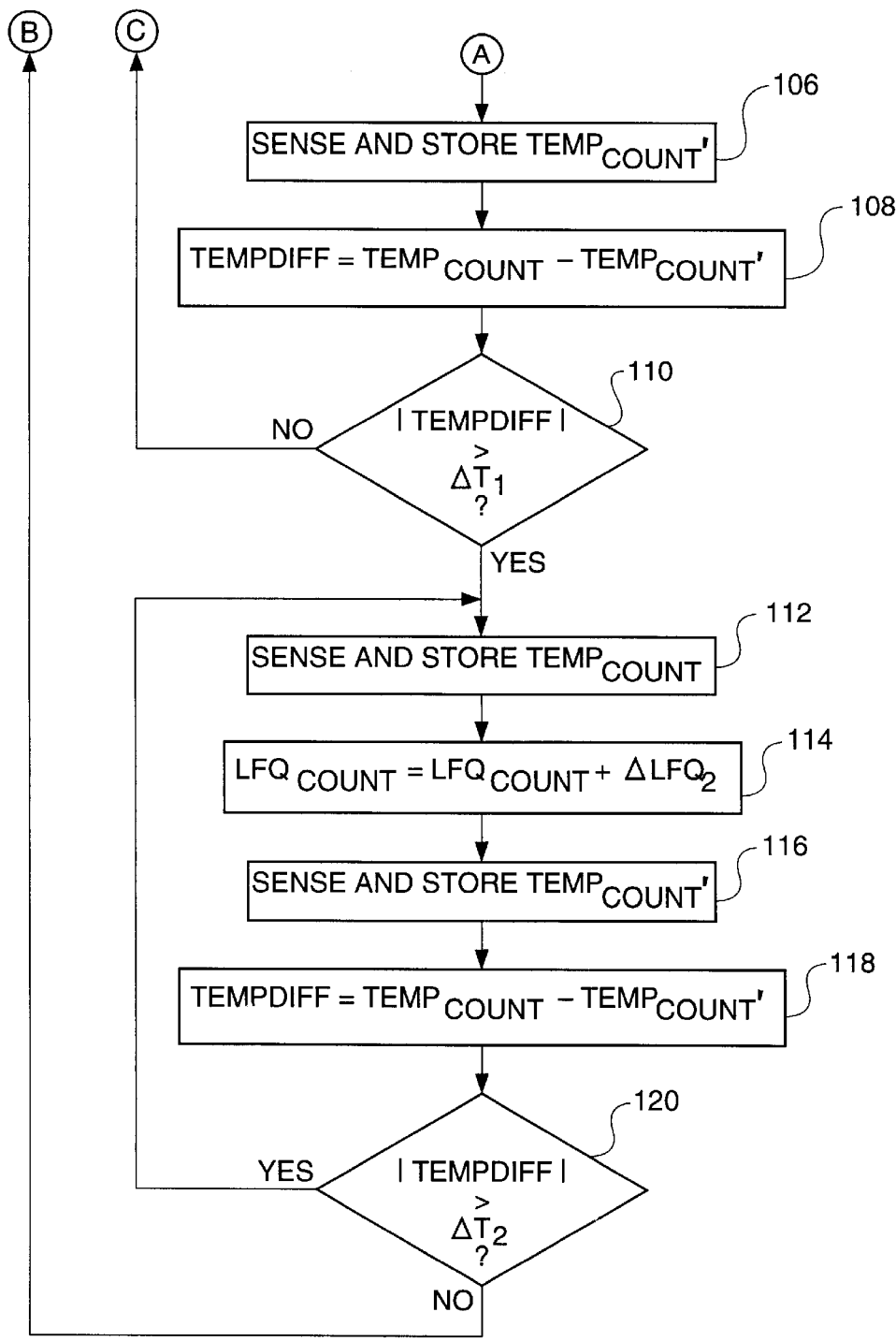
Fig-2b-

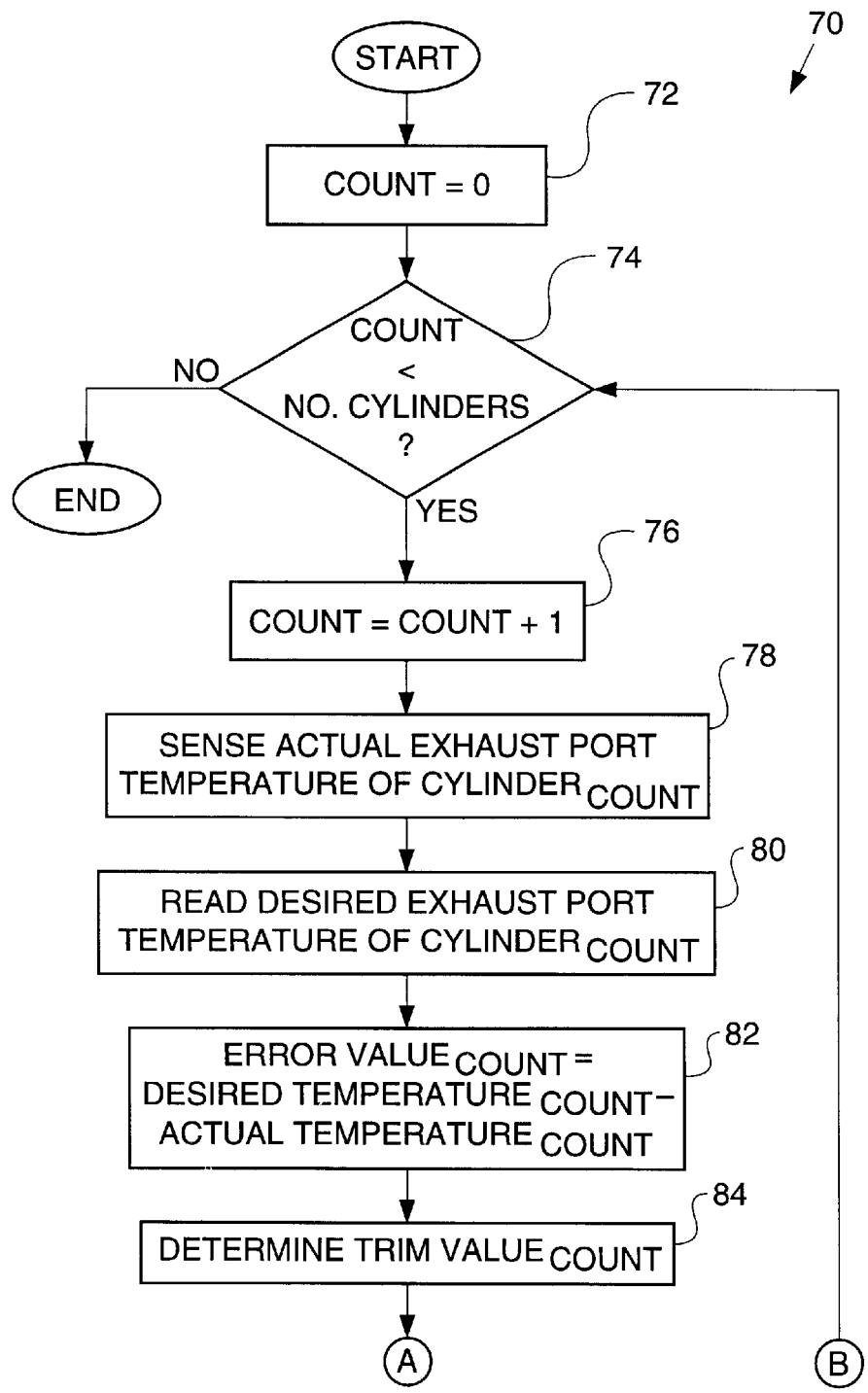
Fig_3a_

METHOD FOR ACHIEVING MINIMUM LIQUID PILOT FUEL DELIVERY TO EACH CYLINDER OF A DUAL FUEL ENGINE WHILE OPERATING IN A DUAL FUEL MODE

TECHNICAL FIELD

This invention relates generally to dual fuel engines and, more particularly, to a method for minimizing the delivery of liquid pilot fuel to each cylinder of a dual fuel engine during a dual fuel operating mode. The present method involves adjusting the liquid pilot fuel quantity to each cylinder based upon an analysis of the exhaust port temperature or other cylinder performance parameters associated with each individual cylinder.

BACKGROUND ART

A dual fuel engine can typically operate in two modes, namely, a dual fuel mode (gaseous fuel and liquid fuel) and a liquid fuel mode. In a strictly liquid fuel mode, a liquid fuel, such as diesel fuel, is injected directly into an engine cylinder or a precombustion chamber as the sole source of fuel and energy during combustion. In a dual fuel mode, a gaseous fuel, such as natural gas, is controllably released into an air intake port of the particular cylinder where the gaseous fuel is mixed with air. After a predetermined period of time, a small amount or pilot amount of diesel fuel is injected directly into the cylinder or precombustion chamber in order to ignite the mixture of air and gaseous fuel. Compression of the air/fuel mixture during the compression stroke ignites the liquid fuel which in turn ignites the air/gaseous fuel mixture.

The amount of minimum liquid pilot fuel necessary for delivery to each individual cylinder to assure good combustion may or may not be the same for each such cylinder due to differences in the operating characteristics of the fuel injectors and valves used to control liquid fuel delivery to such cylinder. Assuming the amount of minimum liquid pilot fuel necessary for delivery to each individual cylinder will be substantially the same for each such cylinder, due to variations in the operating characteristics of the liquid fuel injectors, each liquid fuel injector may require a somewhat different current pulse time in order to achieve the same fuel delivery to each respective cylinder. If the control signals used to deliver fuel to different cylinders are of the same duration, such variations can result in different amounts of liquid fuel being delivered to different cylinders. In addition, because the amount of liquid pilot fuel being delivered to a dual fuel engine is generally small compared to the amount of gaseous fuel being delivered to such engine during a dual fuel operating mode, any variation in the amount of liquid pilot fuel being delivered to the respective cylinders will be magnified and this could seriously effect optimal ignition and combustion of the air/gaseous fuel mixture within each such cylinder.

On the other hand, if the amount of minimum liquid pilot fuel necessary for delivery to each individual cylinder is, in fact, different, the combustion performance of each such cylinder must be evaluated in order to separately determine the least amount of liquid pilot fuel necessary to achieve optimal combustion performance in each respective cylinder. If too little liquid pilot fuel is utilized, optimum ignition and combustion will not be achieved and ignition within any particular cylinder may occur at a retarded timing, or such cylinder may misfire due to incomplete ignition of the gaseous fuel. In either case, deteriorated cylinder performance occurs.

It is therefore desirable to both determine the least amount of liquid pilot fuel necessary to achieve optimal ignition and combustion of the air/gaseous fuel mixture within each particular cylinder of a dual fuel engine for any particular engine operating condition, and thereafter deliver the corresponding minimal amount of liquid pilot fuel to each such cylinder. It is also desirable to minimize fuel cost and reduce the emissions associated with a dual fuel engine.

Accordingly, the present invention is directed to overcoming one or more of the problems as set forth above.

Disclosure of the Invention

In accordance with the teachings of the present invention, a method for controlling and adjusting the delivery of liquid pilot fuel to each individual cylinder in a dual fuel engine using the exhaust port temperature of each such cylinder as a controlling parameter is provided. Before the delivery of liquid pilot fuel to any particular cylinder is adjusted in accordance with the present invention, it is preferred, although not required, that the delivery of gaseous fuel to that particular cylinder be balanced. This is accomplished by trimming all of the gaseous fuel admission valves associated with the dual fuel engine to a predetermined desired exhaust port temperature. This trimming will establish a substantially balanced delivery of gaseous fuel to each respective cylinder based upon the selected desired exhaust port temperature.

Trimming of the gaseous fuel admission valves involves operating the dual fuel engine in its dual fuel mode with a predetermined amount of liquid pilot fuel being delivered to each respective cylinder and thereafter sensing the actual exhaust port temperature of the particular cylinder under investigation. This actual exhaust port temperature is then compared to a predetermined desired exhaust port temperature and, based upon this temperature comparison, a trim value for that particular cylinder is generated. This trim value is indicative of a percentage (%) adjustment factor which is applied to the gaseous fuel admission valve control signal duration time for such cylinder. This, in effect, changes the gaseous fuel admission valve control signal duration time so as to control the gaseous fuel flow to that particular cylinder. Controlling the delivery of gaseous fuel individually to each cylinder likewise controls the air/gaseous fuel mixture for that particular cylinder and balancing the exhaust port temperature for each such cylinder to a common desired exhaust port temperature likewise corresponds to a balanced air/gaseous fuel ratio in all cylinders.

Once the gaseous fuel admission valves are trimmed to achieve a common desired exhaust port temperature as explained above, the initial predetermined amount of liquid pilot fuel being delivered to the particular cylinder under investigation is successively reduced by a first incremental amount until a first predetermined incremental change in the exhaust port temperature for that particular cylinder is observed. Based upon the particular exhaust port temperature versus liquid pilot fuel quantity profile of the particular cylinder under investigation, a particular predetermined incremental change in exhaust port temperature will be indicative of deteriorated cylinder performance based upon less than optimal ignition and combustion of the air/gaseous fuel mixture being supplied to that cylinder. Once this first incremental change in exhaust port temperature is observed, the amount of liquid pilot fuel being delivered to the particular cylinder under investigation is then successively increased by a second incremental amount until an incremental change in exhaust port temperature less than a second predetermined incremental change for that particular cylinder is observed. At this point, the liquid fuel injector control signal duration time for that particular cylinder is adjusted to deliver the last successive amount of liquid pilot fuel to such cylinder. This procedure establishes the minimum amount of liquid pilot fuel to be delivered to that particular cylinder in order to achieve optimum combustion of the gaseous fuel within such cylinder based upon exhaust port temperature. The control loop performing the operational steps of this process are executed in one cylinder at a time until all cylinders of the dual fuel engine are operating at or substantially near their minimum liquid pilot fuel quantity.

The present invention thus provides a method for controlling and adjusting the delivery of liquid pilot fuel to each cylinder of a dual fuel engine during a dual fuel operating mode so as to both minimize the quantity of liquid pilot fuel being delivered to each individual cylinder while, at the same time, ensuring that such minimum quantity of liquid pilot fuel provides optimum ignition of the gaseous fuel within each such cylinder. Although the present method utilizes exhaust port temperature feedback as a means for determining combustion performance on a per cylinder basis, it is also recognized and anticipated that other engine performance parameters such as cylinder pressure may also be utilized as a means for determining combustion performance within any particular cylinder. In addition, a system for delivering, controlling and/or balancing the amount of liquid pilot fuel being delivered to each cylinder of a dual fuel engine can be incorporated into an electronic control module (ECM) of the dual fuel engine for operation in accordance with the teachings of the present invention, or the operating steps of such system can be performed manually by an operator or service personnel via programming associated with a service tool or other processing means such as a laptop computer which can be connected to the ECM of the engine to accomplish the necessary programming to achieve the desired results.

BRIEF DESCRIPTION OF THE DRAWINGS

For a better understanding of the present invention, reference may be made to the accompanying drawings in which:

FIGS. 2A and 2B are flowcharts of operating steps for the dual fuel engine system of FIG. 1 constructed in accordance with the present invention;

FIGS. 3A and 3B are flowcharts of operating steps for trimming the gaseous fuel admission valves in accordance with the present invention;

BEST MODE FOR CARRYING OUT THE INVENTION

Figure 1:
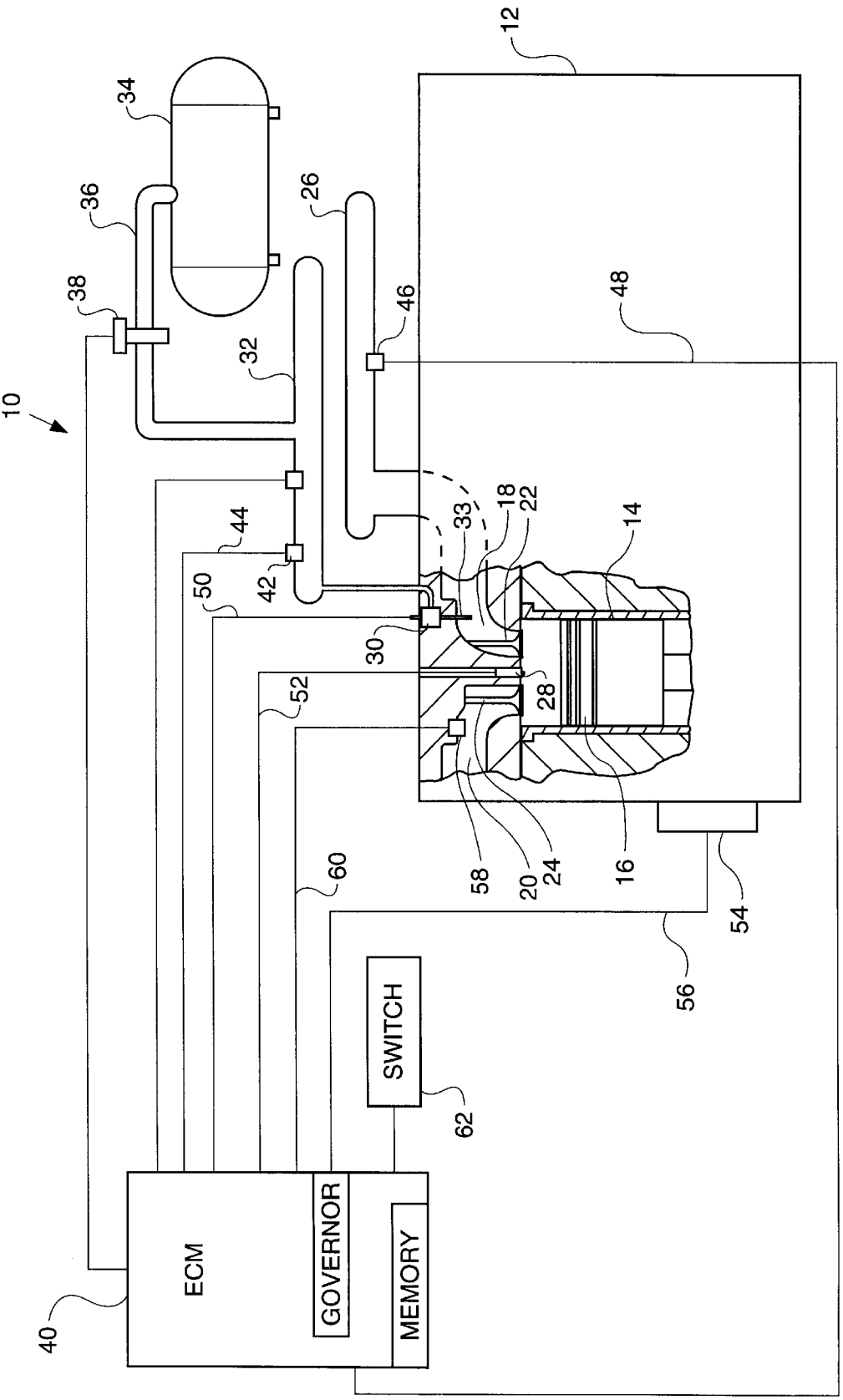
FIG. 1 is a schematic view of a dual fuel engine system constructed in accordance with the teachings of the present invention.

Referring to the drawings, numeral 10 in FIG. 1 depicts a dual fuel engine system used in association with the present invention including an engine 12 having a representative cylinder 14 as shown. Although only one cylinder 14 is illustrated in FIG. 1, it is recognized that the total number of cylinders associated with engine 12 could vary and that engine 12 could be of the in-line type, V-type, or even a rotary type engine. Piston 16 is positioned for displacement within cylinder 14, cylinder 14 including an intake port 18 having a respective valve 22 associated therewith and an exhaust port 20 having a respective valve 24 associated therewith. Intake port 18 receives air from air manifold 26 to which intake air travels after passing through, for example, an air filter (not shown) and a turbocharger (not shown). Engine 12 also includes a fuel injector 28, such as an electronic unit injector, positioned for injecting liquid fuel, such as diesel fuel, into cylinder 14. The liquid fuel may be provided to fuel injector 28 by means commonly known in the art.

A gaseous fuel admission valve 30 is positioned between a gaseous fuel manifold 32 on the upstream side and an intake port 18 on the downstream side, the valve 30 including a nozzle portion 33 extending into intake port 18 for delivering gaseous fuel thereto. Gaseous fuel admission valve 30 may, for example, be of the type shown and described in U.S. Pat. No. 5,398,724 available from Woodward Governor Company. Gaseous fuel manifold 32 is connected to a source of gaseous fuel 34 by fuel path 36, a solenoid operated gaseous fuel shutoff valve 38 being positioned at an intermediate location along fuel path 36. Although not shown, it is recognized and anticipated that such a system might typically include a balance regulator positioned between gaseous fuel source 34 and gaseous fuel manifold 32 for regulating the gaseous fuel pressure at the upstream side of the gaseous fuel admission control valve 30.

An electronic control module (ECM) 40 is connected to a gaseous fuel pressure sensor 42 via conductive path 44 and to an intake air pressure sensor 46 via conductive path 48 for receiving pressure indicative signals from each of such sensors. Such pressure sensors are well known in the art and therefore a detailed description of such sensors is not included herein. ECM 40 is connected for controlling gaseous fuel admission valve 30 by conductive path 50 and is also connected for controlling fuel injector 28 by conductive path 52. In this regard, it is known to include driver circuitry within ECM 40 for delivering current control signals to such devices. However, it is recognized that such driver circuitry could be formed separate from, but connected to, ECM 40. An engine speed sensor 54 associated with a camshaft of engine 12 is also connected to ECM 40 via conductive path 56 for delivering engine speed indicative signals thereto. ECM 40 will typically include processing means, such as a microcontroller or microprocessor, associated electronic circuitry such as input/output circuitry, as well as associated memory.

An exhaust port temperature sensor 58 is positioned within the exhaust port 20 of cylinder 14 for sensing and monitoring the exhaust port temperature associated with cylinder 14. The exhaust port temperature sensor 58 is connected to ECM 40 via conductive path 60 for delivering exhaust port temperature indicative signals thereto. Each cylinder of engine 12 will include a temperature sensor such as sensor 58.

As noted above, dual fuel engine 12 can operate in a liquid fuel mode in which diesel fuel only is delivered to the engine cylinders by the liquid fuel injectors 28. Engine 12 can also operate in a dual fuel mode in which gaseous fuel, such as natural gas, is delivered to the engine cylinders by gaseous fuel admission control valves 30, and in which a small amount of diesel fuel is also delivered to the cylinders. In the dual fuel mode, the gaseous fuel is mixed with air in intake port 18 of cylinder 14 and a small amount or pilot amount of liquid fuel is injected into cylinder 14 in order to ignite the mixture of air and gaseous fuel. Typically control of the mode of engine operation may be via operator input to ECM 40 such as from a mode selection switch 62, as well as from other engine operating parameters sensed by ECM 40 such as engine speed and engine load.

The fuel control system of engine 12 operates by establishing a governor output value (X) indicative of a total fuel energy rate desired to be delivered to the engine to maintain a desired engine speed. The desired engine speed may be a predetermined, stored engine speed or it may be indicated, for example, by a throttle setting. A first value (Y) indicative of a liquid pilot fuel energy rate desired to be delivered to the engine and a second value (Z) indicative of a gaseous fuel energy rate desired to be delivered to the engine are each determined such that the sum of the desired liquid pilot fuel energy rate and the desired gaseous fuel energy rate is substantially equal to the desired total fuel energy. A liquid fuel injector control signal duration and a gaseous fuel admission valve control signal duration are both determined such that the liquid fuel delivered to the engine provides the desired liquid pilot fuel energy rate and the gaseous fuel delivered to the engine provides the desired gaseous fuel energy rate. The gaseous fuel admission valve control signal duration corresponding to gaseous fuel value (Z) is determined by an appropriate calculation which takes into account the gaseous fuel pressure, the intake air pressure, a gaseous fuel manifold temperature, the stored gaseous fuel energy content value ($E_G$), and the known flow characteristics of gaseous fuel admission valve 30 in accordance with the following equation:

$$GASDURATION_Z = [(Z^*K_1^*E_L)/(N_I^*S^*E_G^*F_G)] + t_C$$

where Z (mm) is a rack value, $K_1$ (g/mm*min) is a predetermined constant for converting rack to a liquid fuel flow rate, $E_L$ (J/g) is the energy content of the liquid fuel, $N_I$ (inj/rev) is the number of injections per engine revolution, S (rev/min) is the engine speed, $E_G$ (J/g) is the stored gaseous fuel energy content, $F_G$ (g/sec) is the flow rate of the gaseous fuel admission valve, and $t_C$ (sec) is an offset to account for mechanical delays and reduced flow for gaseous fuel admission valve 30 during valve opening and closing. With respect to liquid pilot fuel value (Y) and gaseous fuel value (Z), value (Y) is determined as a function of engine speed and engine load and value (Z) is defined as Z=X−Y.

Operating steps in accordance with the present invention are set forth in flowchart 64 illustrated in FIGS. 2A and 2B. Such steps can be incorporated into the programming of the processing means of ECM 40 by techniques well known to those of ordinary skill in the art, or such steps can be incorporated into other processing means such as a service tool which can be manually initiated by an operator or service personnel. In either scenario, the steps of flowchart 64 are initiated while the engine is operating in a dual fuel mode and the control loop performing such steps is executed in one cylinder at a time.

Figure 4:
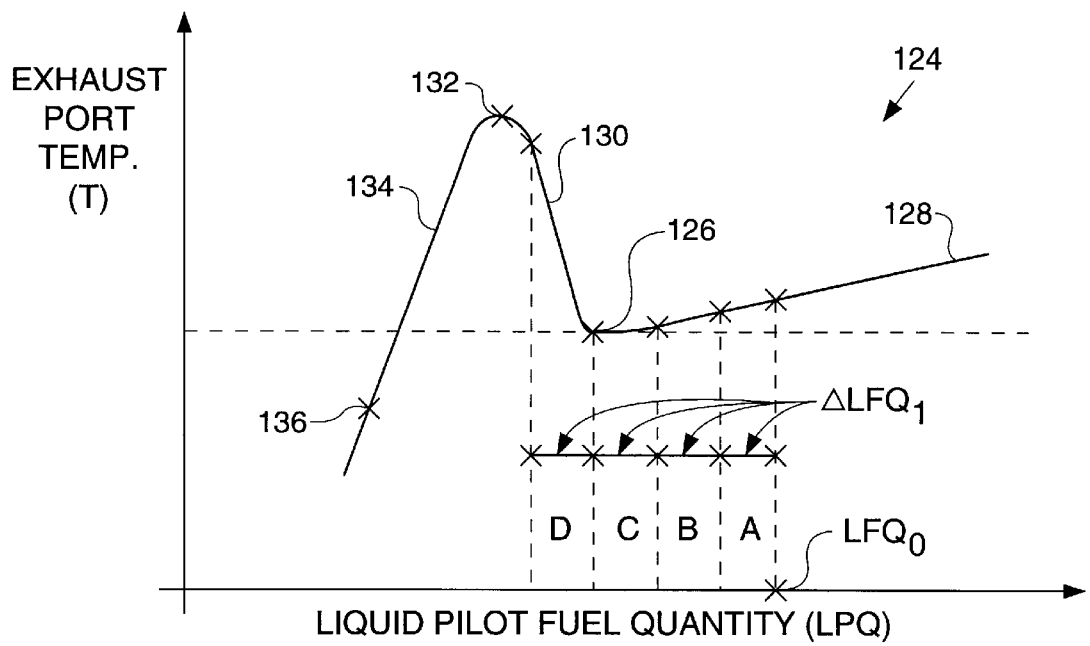
FIG. 4 is a representative profile of exhaust port temperature versus liquid pilot fuel quantity for a cylinder using a particular liquid fuel injector.
Figure 5:
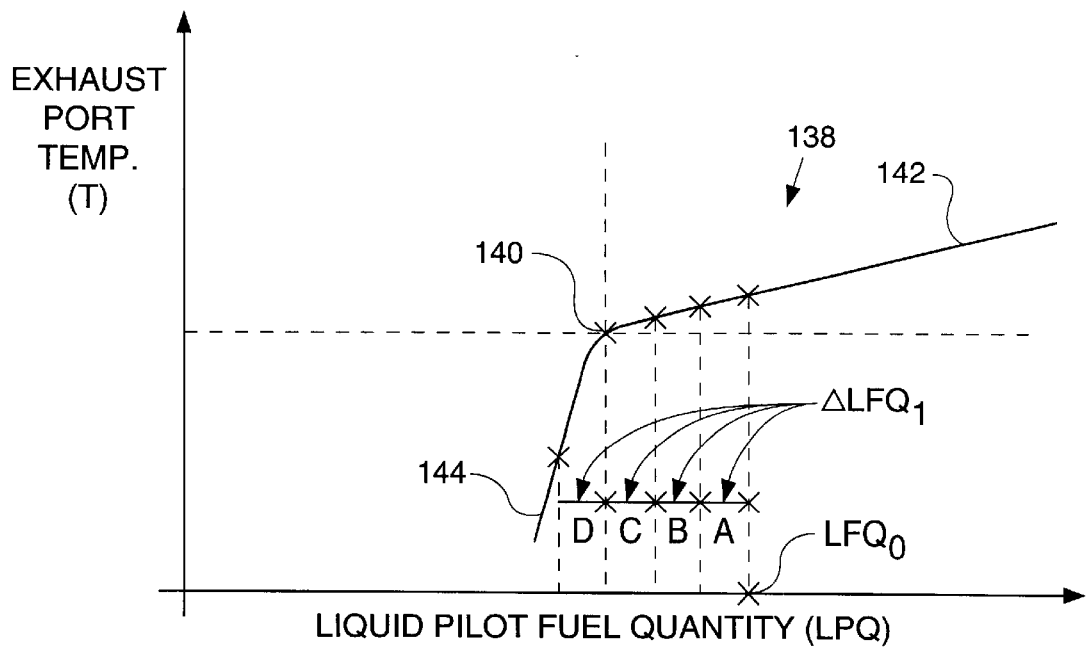
FIG. 5 is a representative profile of exhaust port temperature versus liquid pilot fuel quantity for a cylinder using another liquid fuel injector.

Once control loop 64 is initiated at step 66, the dual fuel engine 12 is operated in its dual fuel mode with a predetermined amount of liquid pilot fuel $LFQ_0$ being delivered to each cylinder 14 through the respective liquid fuel injectors 28. This predetermined liquid pilot fuel quantity $LFQ_0$ is an amount of liquid fuel known to produce complete ignition of the air/gaseous fuel mixture within each cylinder, but which amount is greater than the minimal desired liquid pilot fuel quantity required to achieve optimal ignition and combustion in each respective cylinder. Because of the differences in the operating characteristics of the liquid fuel injectors 28 used to deliver liquid pilot fuel to each individual cylinder, and because of other factors as previously explained, the minimum liquid pilot fuel quantity required to achieve optimal combustion in each individual cylinder may vary. For this reason, $LFQ_0$ must be selected so as to ensure complete combustion in each cylinder regardless of the variations and differences in operating characteristics between the respective fuel injectors 28. $LFQ_0$ is a value derived from prior engine testing based upon the use of a specific type of liquid fuel injector 28 in each cylinder 14. For example, FIGS. 4 and 5 illustrate representative cylinder profiles of exhaust port temperature versus liquid pilot fuel quantity for a particular type of liquid fuel injector. $LFQ_0$ is a fuel quantity value selected as illustrated in FIGS. 4 and 5 so as to be greater than the minimum liquid pilot fuel quantity necessary to achieve complete or optimal combustion within each such cylinder. Changing the amount of liquid pilot fuel to each individual cylinder can be accomplished by either adjusting the liquid fuel injector control signal duration time or by adjusting the liquid pilot fuel rack value (Y). It is also recognized and anticipated that $LFQ_0$ can be determined from a three-dimensional map, or can be calculated by ECM 40.

Figure 3B:
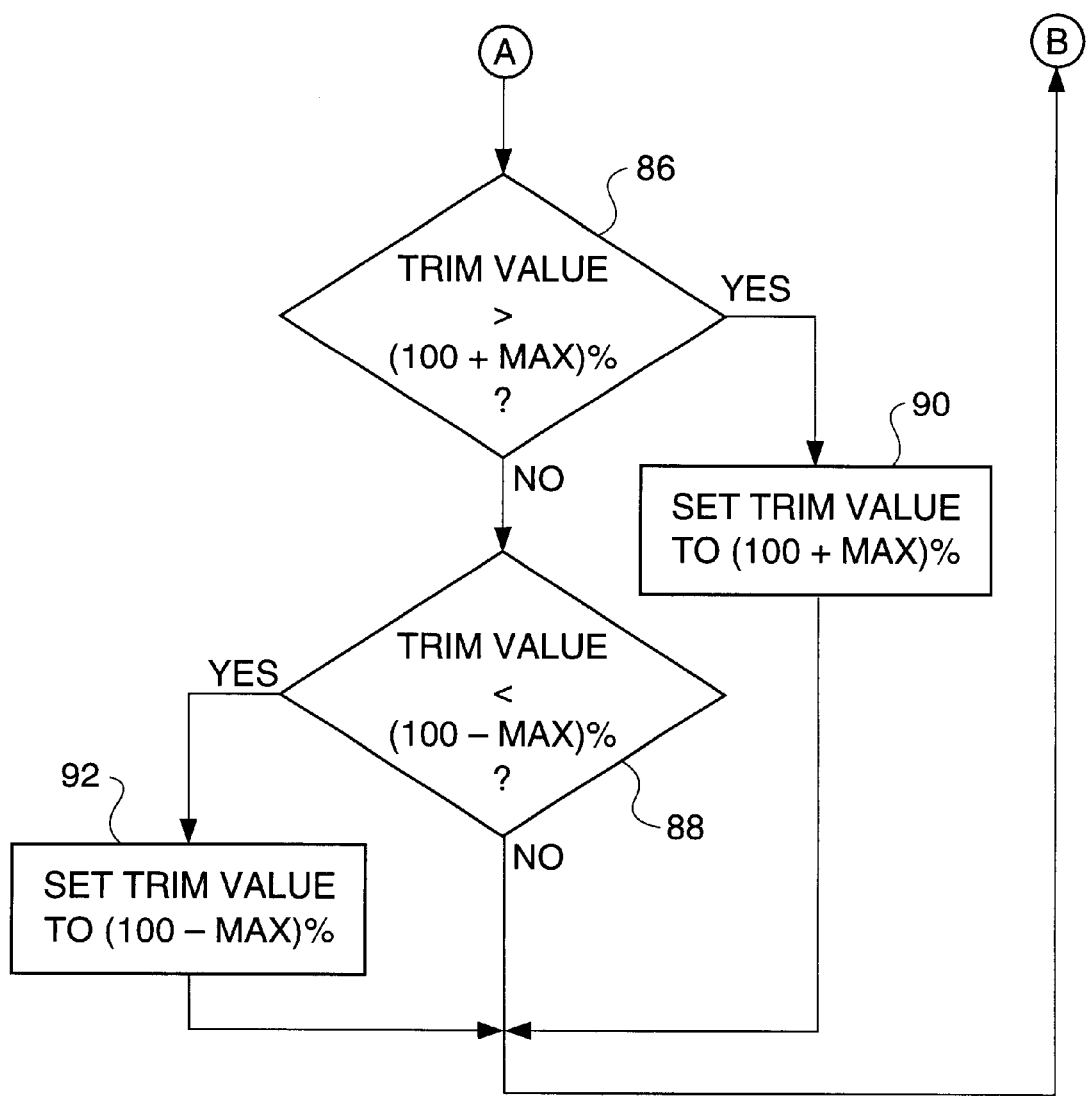

Once the dual fuel engine is operated in its dual fuel mode at liquid pilot fuel quantity $LFQ_0$, the respective gaseous fuel admission valves associated with the respective cylinders 14 are balanced and trimmed at step 68 to a common desired exhaust port temperature in accordance with the operating steps set forth in flowchart 70 illustrated in FIGS. 3A and 3B. Trimming each individual cylinder to the same desired exhaust port temperature will control the delivery of gaseous fuel to each such cylinder and, in effect, will trim each such cylinder to substantially the same air/gaseous fuel ratio. This trimming operation will, in effect, substantially equalize the amount of gaseous fuel being delivered to each individual cylinder and predetermined incremental changes in exhaust port temperature can be correlated to poor ignition and combustion of the air/gaseous fuel mixture in each such cylinder as a function of the quantity of liquid pilot fuel being delivered to each such cylinder.

Referring to FIGS. 3A and 3B, once control loop 70 is initiated, the variable COUNT is set to zero at step 72. This stored COUNT is then compared to the total number of cylinders associated with engine 12 at step 74 and if the variable COUNT is less than the total number of engine cylinders, the variable COUNT is incremented by one at step 76. The actual exhaust port temperature associated with the cylinder under investigation is then sensed by temperature sensor 28 at step 78 and this temperature value is then stored in the memory associated with ECM 40. At step 80, ECM 40 reads the desired exhaust port temperature for the cylinder and compares the desired exhaust port temperature with the actual exhaust port temperature at step 82 and generates an error value representative of this comparison.

The desired exhaust port temperature is preferably the average exhaust port temperature of all of the cylinders as calculated by ECM 40. It is also recognized and anticipated that the desired exhaust port temperature may be determined from sensed engine parameters such as from a map based upon prior engine testing and such desired temperature may be representative of a particular engine operating condition such as the normal operating condition of such engine at a certain engine speed and engine load. Nevertheless, regardless of how the desired exhaust port temperature is actually derived, based upon the error value determined at step 82, ECM 40 determines a distinct trim value for that particular cylinder at step 84. The trim value determined in step 84 is a percent value indicative of an adjustment factor which will be applied to the control signal duration of the gaseous fuel admission valve within such cylinder. In general, if the actual exhaust port temperature is greater than the desired exhaust port temperature, such is indicative of delivery of more gaseous fuel than desired to the cylinder and the trim value determined will be a value intended to result in delivery of less gaseous fuel to the cylinder. If the actual exhaust port temperature is less than the desired exhaust port temperature, such is indicative of delivery of less gaseous fuel than desired to the cylinder and the trim value determined will be a value intended to result in delivery of more gaseous fuel to the cylinder.

In either case, the determined trim value is then compared with a maximum allowable trim change percentage so as to limit the trim change for any particular loop 70 to no more than a specified incremental change. This trim change limiting procedure is accomplished at steps 86 and 88 illustrated in FIG. 3B. For example, if it is determined that the maximum allowable trim change to any particular cylinder during any particular control loop 70 is ±5%, then the term MAX utilized in steps 86 and 88 will be equal to 5 and the overall percent range for the trim value determined in step 84 will be 105% (100+MAX) % in step 86 and 95% (100−MAX) % in step 88. If the determined trim value is less than the predetermined amount (100+MAX) in step 86, then such trim value is compared to the predetermined amount (100−MAX) at step 88. If the determined trim value is likewise greater than (100−MAX), then the trim value percentage determined at step 84 falls within the allowable range established by steps 86 and 88 and this trim value will then be applied to the appropriate control signal duration time as will be hereinafter explained. If the determined trim value is greater than the predetermined amount (100+MAX), ECM 40 will automatically set the trim value to the predetermined amount (100+MAX) at step 90 and this trim value will override the trim value determined at step 84. In similar fashion, if the trim value established at step 84 is less than the predetermined amount (100−MAX) set forth at step 88, then ECM 40 will set the trim value to the predetermined amount (100−MAX) and this trim value will override the trim value determined at step 84.

The computed trim value for a particular cylinder determined as a result of control loop 70 is then applied to the cylinder's gaseous fuel admission valve 30 and, in effect, ECM 40 will multiply the gaseous fuel admission valve control signal duration time by the computed trim value percentage and produce a trimmed control signal duration time for that particular cylinder. Once control loop 70 is completed for a particular cylinder of engine 12, the variable COUNT is then compared with the total number of engine cylinders at 74 and if such variable COUNT is still less than the total number of engine cylinders, steps 76–92 are repeated for the next individual cylinder. This process continues until all of the individual cylinders associated with engine 12 are analyzed. When the variable COUNT at step 74 is equal to the number of engine cylinders, control loop 70 will end. Control loop 70 can be executed at any predetermined or dynamically determined number of times. After which, all of the gaseous fuel admission valves 30 associated with engine 12 have been balanced and trimmed to a common desired exhaust port temperature in accordance with control loop 70.

Referring again to FIG. 2A, once control loop 70 has been completed for all cylinders at step 68, the variable COUNT is again set to zero at step 94. This stored COUNT is then again compared to the total number of cylinders associated with engine 12 at step 96 and if the variable COUNT is less than the total number of engine cylinders, the variable count is incremented by one at step 98. At step 100, the variable liquid pilot fuel quantity $LFQ_{count}$ is set to equal the initial predetermined liquid pilot fuel quantity $LFQ_0$ established at step 66. At step 102, the existing or actual exhaust port temperature of the particular cylinder under investigation is sensed and stored in memory. This memory can be associated with ECM 40 or some other processing means separate and apart from engine 12 such as a laptop computer as will be hereinafter discussed. At step 104, $LFQ_{count}$ is decreased by an incremental amount of liquid pilot fuel $\Delta LFQ_1$ and this reduced amount of liquid pilot fuel is then delivered to the liquid fuel injector 28 for that particular cylinder.

Delivery of this reduced amount of liquid pilot fuel to the particular cylinder under investigation as established at step 104 may result in a change in the exhaust port temperature for that particular cylinder. As a result, the actual exhaust port temperature produced as a result of delivering this reduced amount of liquid pilot fuel is again sensed by temperature sensor 28 and stored within the memory of ECM 40, or some other processing means, at step 106 and the exhaust port temperature stored at step 102 is compared with the exhaust port temperature stored at step 106 and this temperature difference is generated at step 108. The absolute value of this temperature difference is then compared with a first predetermined incremental change in exhaust port temperature ($\Delta T_1$) at step 110. If the absolute value of this temperature difference is not greater than the incremental temperature change $\Delta T_1$ at step 110, steps 102, 104, 106, 108 and 110 are repeated for that particular cylinder and the absolute value of a further temperature difference based upon a further reduction in liquid pilot fuel quantity as established at step 104 is again compared with $\Delta T_1$ at step 110. Steps 102, 104, 106, 108 and 110 are successively repeated until the absolute temperature difference established in step 110 is, in fact, greater than $\Delta T_1$.

As will be hereinafter further explained, $\Delta T_1$ is selected based upon the known temperature profile of each cylinder 14. Representative samples of some of these profiles are illustrated in FIGS. 4 and 5. These profiles are determined based upon prior engine testing and the change in exhaust port temperature represented by $\Delta T_1$ can be calculated by ECM 40 or some other processing means, or such value can be determined from a map. When the absolute temperature difference established at step 110 is greater than the first predetermined temperature change $\Delta T_1$, steps 112, 114, 116, 118 and 120 illustrated in FIG. 2B are then accomplished.

Referring to FIG. 2B, steps 112, 114, 116 and 118 are substantially identical to steps 102, 104, 106 and 108 except that step 114 now increases the amount of liquid pilot fuel being delivered to the particular cylinder under investigation by an incremental amount $\Delta LFQ_2$. The exhaust port temperature sensed and stored at step 112, which temperature represents the actual exhaust port temperature of the particular cylinder under investigation at the last delivered liquid pilot fuel quantity established at step 104, is now compared with the exhaust port temperature sensed and stored at step 116 after the amount of liquid pilot fuel being delivered to that particular cylinder has been increased by a second incremental amount $\Delta LFQ_2$. This absolute temperature difference is then compared at step 120 with a second predetermined change in temperature $\Delta T_2$ and if the absolute value of this temperature difference is greater than the predetermined amount $\Delta T_2$, steps 112, 114, 116, 118 and 120 are successively repeated as explained with respect to steps 102–110 until the absolute temperature difference of step 120 is no longer greater than the predetermined change in exhaust port temperature $\Delta T_2$. At this point, as will be hereinafter further explained, it has been determined that the amount of liquid pilot fuel being delivered to that particular cylinder is substantially close to the minimum liquid pilot fuel required to achieve optimum ignition and combustion and this amount of liquid pilot fuel as established as a result of the last iteration of step 114 is provided to the particular cylinder by ECM 40.

$\Delta LFQ_2$ and $\Delta T_2$ are preferably selected so as to be smaller in value respectively as compared to $\Delta LFQ_1$ and $\Delta T_1$. This is done such that the liquid pilot fuel quantity can be incrementally increased at smaller intervals so that the minimum amount of liquid pilot fuel necessary to produce optimal ignition and combustion of the gaseous fuel can be more accurately approached and determined. The selection of $\Delta T_2$ will likewise be dependent upon the specific temperature profile of the cylinder such as one of the profiles illustrated in FIGS. 4 and 5.

Control loop 64 is now complete for one particular cylinder of engine 12 and steps 96 through 120 are then repeated for the next individual cylinder. This process continues until the liquid fuel injectors for all of the cylinders associated with dual fuel engine 12 are trimmed in accordance with steps 96–120. When the variable COUNT at step 96 is equal to the number of engine cylinders, the balancing process is complete and control loop 64 will end at step 122. At this point, all of the liquid fuel injectors 28 associated with engine 12 have been adjusted so as to achieve optimum ignition of the air/gaseous fuel mixture within each such cylinder with a minimum amount of liquid pilot fuel being delivered to each such cylinder.

Industrial Applicability

The present invention provides a method for controlling and adjusting the delivery of liquid pilot fuel to each cylinder of a dual fuel engine so as to achieve the delivery of a minimum amount of liquid pilot fuel necessary to produce optimum ignition and combustion of the gaseous fuel within each such cylinder. Because the present method utilizes exhaust port temperature feedback as a means for determining combustion performance on a per cylinder basis, the temperature profile of each cylinder based upon the use of a particular liquid fuel injector in each such cylinder must be taken into consideration when establishing at least some of the variable parameters identified in control loop 64. An example of the operation of control loop 64 in accordance with the teachings of the present invention will now be discussed based upon the temperature profiles illustrated in FIGS. 4 and 5. It is recognized and anticipated that the temperature profiles illustrated in FIGS. 4 and 5 are for illustrative purposes only and that a wide variety of other cylinder temperature profiles may likewise exist depending upon the specific type of liquid fuel injector being utilized in each such cylinder as well as other cylinder and engine parameters. It is also recognized and anticipated that the operational steps of control loop 64 can be adapted to yield the desired results based upon any given cylinder profile.

FIGS. 4 and 5 are examples of two temperature versus liquid pilot fuel quantity profiles which are representative of profiles associated with cylinders in a dual fuel engine. The temperature profile 124 illustrated in FIG. 4 was obtained from actual engine testing using a particular liquid fuel injector 28. As can be seen from FIG. 4, the minimum amount of liquid pilot fuel necessary to achieve optimal ignition and combustion of the gaseous fuel within the profiled cylinder is illustrated at point 126. As the amount of liquid pilot fuel is increased from point 126 to $LFQ_0$ and beyond, the exhaust port temperature of the profiled cylinder will gradually increase as represented by the slope of line portion 128. On the other hand, as the amount of liquid pilot fuel is reduced from the minimum amount at point 126, the exhaust port temperature within the profiled cylinder rises much more rapidly as represented by the slope of line portion 130 until a peak temperature is achieved at point 132. As the amount of liquid pilot fuel continues to be reduced beyond point 132, the exhaust port cylinder temperature begins to rapidly decrease as indicated by the slope of line portion 134 until the liquid pilot fuel quantity reaches a point such as point 136 wherein the amount of liquid pilot fuel being delivered to the profiled cylinder is so low that ignition of the gaseous fuel within such cylinder is either sparatic or non-existent and the cylinder misfires.

The rapid rise in exhaust port temperature due to a decrease in the amount of liquid pilot fuel being delivered to the profiled cylinder as represented by the slope of line portion 130 is generally caused by retarded timing wherein the liquid pilot fuel is igniting the gaseous fuel within the cylinder at some point in time after ignition should normally take place. Knowing the profile of the cylinders under investigation based upon use of a specific liquid fuel injector 28 in each respective cylinder such as the cylinder profile 124 illustrated in FIG. 4, the present method represented by flowchart 64 is designed to seek out and hone in on the minimum liquid pilot fuel quantity necessary to achieve optimal ignition or combustion as represented by point 126 in FIG. 4.

Referring again to FIGS. 2A and 2B and using the cylinder profile illustrated in FIG. 4, the liquid pilot fuel quantity $LFQ_0$ delivered to each of the liquid fuel injectors 28 associated with a dual engine at step 66 of control loop 64 is selected so as to be to the right of point 126 along line portion 128 as illustrated in FIG. 4. As previously explained, this liquid pilot fuel quantity $LFQ_0$ is selected so as to ensure that all liquid fuel injectors 28 associated with engine 12 will be delivering more than the minimum amount of pilot fuel necessary to achieve optimum ignition and combustion in each respective cylinder. Since the profile of each cylinder 14 of engine 12 can be mapped as illustrated in FIG. 4, this predetermined liquid fuel quantity can be easily selected.

Once the gaseous fuel admission valves are trimmed and balanced in accordance with flowchart 70 as previously explained, each cylinder of the dual fuel engine is then analyzed in accordance with operating steps 98–110 of flowchart 64. If, for purposes of example, the gaseous fuel admission valves have been balanced and trimmed to a desired exhaust port temperature of 500° C., the liquid pilot fuel quantity $LFQ_0$ will be reduced by a fixed incremental amount $\Delta LFQ_1$ and the exhaust port temperature stored at step 102, namely 500° C., will be compared with a new exhaust port temperature sensed and stored at step 106. Since the slope of line portion 128 is substantially shallower than the slope of line portion 130, any incremental change in exhaust port temperature due to an incremental reduction of liquid pilot fuel quantity ($\Delta LFQ_1$) along line portion 128 will be substantially smaller than any incremental change in exhaust port temperature due to the same incremental reduction of liquid pilot fuel quantity ($\Delta LFQ_1$) along line portion 130. This can be easily seen by viewing sections A, B, C and D of FIG. 4.

Sections A, B, C and D of FIG. 4 each represent an incremental reduction of liquid pilot fuel equal to $\Delta LFQ_1$. As can be seen, the incremental change of exhaust port temperature in sections A, B and C is considerably less than the incremental change in exhaust port temperature as represented in section D. Knowing this temperature profile, the change in exhaust port temperature $\Delta T_1$ established in step 110 of control loop 64 can be selected to be representative of the temperature change experienced along line portion 130 of FIG. 4. For example, for illustrative purposes only, the change in exhaust port temperature in sections A, B and C in FIG. 4 may be in the order of 10° C. Where as the change in exhaust port temperature in section D may be in the order of 50° C. If, for example, $\Delta T_1$ in step 110 is established at 40° C., steps 102–110 will be repeated until a temperature difference greater than 40° C. is achieved by a successive reduction in liquid pilot $\Delta LFQ_1$.

Since an analysis of the temperature difference experienced in section D of FIG. 4 is greater than the predetermined $\Delta T_1$ established at step 110, steps 112–120 will now be initiated in an effort to incrementally increase the liquid pilot fuel quantity back towards the desired minimum represented at point 126. As a result, in an effort to slowly hone in on point 126, $\Delta LFQ_2$ established in step 114 is preferably selected to be smaller than $\Delta LFQ_1$ established in step 104, and $\Delta T_2$ established in step 120 is preferably selected to be smaller than $\Delta T_1$ established in step 110. In the example described above with respect to FIG. 4, $\Delta T_2$ may be selected to be 25° C. and the temperature difference established at step 118 is compared with $\Delta T_2$ at step 120, and an overall change in exhaust port temperature of less than $\Delta T_2$ will ensure that we are substantially near point 126 and, preferably, slightly to the right of point 126 within section C illustrated in FIG. 4.

If the temperature difference established at step 118 is in fact greater than $\Delta T_2$ then the liquid pilot fuel quantity which has yielded a temperature difference greater than $\Delta T_2$ is still associated with line portion 130 and this fuel quantity does not represent the minimum liquid pilot fuel quantity for achieving optimal ignition and combustion. On the other hand, the last liquid pilot fuel quantity established at step 114 which triggers a temperature difference less than $\Delta T_2$ is considered to be the minimum liquid pilot fuel which will still yield optimum ignition and combustion in the particular cylinder under investigation. The liquid fuel injector 28 associated with the particular cylinder under investigation can then be balanced and trimmed to this minimum liquid pilot fuel quantity by either adjusting the liquid fuel injector control signal duration time or by adjusting the liquid pilot fuel rack value (Y) so as to achieve the delivery of the minimum liquid pilot fuel quantity established during the last iteration of step 114. This sequence is then performed on each cylinder until all cylinders are delivering their minimum liquid pilot fuel quantity in accordance with control loop 64.

FIG. 5 illustrates another temperature versus liquid pilot fuel quantity profile 138 which may also be associated with cylinders in a dual fuel engine. As can be seen from an analysis of FIG. 5, this particular cylinder profile does not exhibit the temperature hump, or spike, associated with profile 124 illustrated in FIG. 4. The minimum liquid pilot fuel quantity necessary to achieve optimal ignition and combustion is represented at point 140 in FIG. 5 and a reduction of the liquid pilot fuel quantity below this amount results in a substantially rapid decrease in exhaust port temperature. Here again, the slope of line portion 142 is substantially less than the slope of line portion 144. As explained with respect to FIG. 4, $LFQ_0$ is again selected so as to be to the right of point 140 along line portion 142 and the temperature difference experienced in sections A, B and C of FIG. 5 due to the incremental reduction of liquid pilot fuel quantity by an amount $\Delta LFQ_1$ (step 104) is substantially smaller than the change in exhaust port temperature experienced in section D of FIG. 5. Here again, the variables $\Delta LFQ_1$, $\Delta LFQ_2$, $\Delta T_1$ and $\Delta T_2$ are selected based upon profile 138 and these predetermined values may be different from the values selected on the basis of profile 124. Execution of operating steps 112–120 will again slowly increase the liquid pilot fuel quantity by preferably a smaller incremental amount $\Delta LFQ_2$ until a liquid pilot fuel quantity substantially close to point 140 is achieved as previously explained. Based upon cylinder profile 138, the present method will again achieve a minimum liquid pilot fuel quantity substantially close to point 140 illustrated in FIG. 5, which minimum fuel quantity will also achieve optimum ignition and combustion of the gaseous fuel delivered to each respective cylinder 14.

It is also recognized and anticipated that other cylinder profiles may exist for dual fuel engines, and it is likewise recognized and anticipated that the variables $\Delta LFQ_1$, $\Delta LFQ_2$, $\Delta T_1$ and $\Delta T_2$ may be selected as to be compatible with any particular cylinder profile so as to achieve the desired results of control loop 64. Still further, it is recognized and anticipated that other feedback means for determining combustion performance on a per cylinder basis such as cylinder pressure could likewise be used instead of cylinder exhaust port temperature to achieve the desired results of control loop 64. In this regard, cylinder profiles based upon cylinder pressure versus the liquid pilot fuel quantity similar to the profiles illustrated in FIGS. 4 and 5 could likewise be developed and the variable parameters $\Delta T_1$ and $\Delta T_2$ could be replaced in control loop 64 with corresponding incremental changes in cylinder pressure $\Delta P_1$ and $\Delta P_2$. In this situation, the incremental changes in cylinder pressure $\Delta P_1$ and $\Delta P_2$ can be selected to correspond to the appropriate portions of the pressure profile similar to the selection of the incremental values $\Delta T_1$ and $\Delta T_2$ discussed above. Other cylinder performance indicators can likewise be incorporated into control loop 64.

It is further recognized that variations in the steps depicted in flowcharts 64 and 70 could be made without departing from the spirit and scope of the present invention. In particular, steps could be added or some steps could be eliminated. All such variations are intended to be covered by the present invention. It is also recognized that in most applications, an engine control system including ECM 40 will include a variety of other sensors and control apparatus.

Still further, it is recognized and anticipated that the operating steps of control loop 64 can be either totally or partially incorporated into the programming of the processing means of ECM 40 for activation by an operator or service personnel. In this case, other processing means such as a laptop computer can be utilized by a service personnel to initiate routines stored within ECM 40. It is also recognized that the operating steps of control loop 64 can be completely incorporated into processing means other than ECM 40, such as the software associated with a laptop computer or other diagnostic and/or calibration programming means, and that a service personnel can initiate such programming from such other processing means. Further, although it is preferred that each cylinder be evaluated on an individual basis, it is recognized that in some applications, it may be possible to evaluate two or more cylinders simultaneously.

Other aspects, objects and advantages of the present invention can be obtained from a study of the drawings, the disclosure and the appended claims.

We claim:

1. A method for controlling the delivery of liquid pilot fuel to each cylinder of a dual fuel engine wherein each cylinder includes at least one controllable liquid fuel injector for delivering liquid pilot fuel to such cylinder, the method comprising the steps of:

(a) operating the dual fuel engine in a dual fuel mode;

(b) selecting a cylinder of the dual fuel engine;

(c) establishing a first predetermined incremental amount of liquid pilot fuel;

(d) establishing a first predetermined incremental change in a cylinder performance parameter for the selected cylinder;

(e) reducing delivery of liquid pilot fuel to the selected cylinder by the first predetermined incremental amount established in step (c);

(f) comparing a change in the cylinder performance parameter as a result of the incremental reduction of liquid pilot fuel in step (e) with the first predetermined incremental change in the cylinder performance parameter established in step (d);

(g) repeating steps (e) and (f) so as to successively reduce delivery of liquid pilot fuel to the selected cylinder until the change in the cylinder performance parameter is greater than the first predetermined incremental change in such parameter established in step (d);

(h) establishing a second predetermined incremental amount of liquid pilot fuel;

(i) establishing a second predetermined incremental change in the cylinder performance parameter for the selected cylinder;

(j) increasing delivery of liquid pilot fuel to the selected cylinder by the second predetermined incremental amount established in step (h);

(k) comparing a change in the cylinder performance parameter as a result of the incremental increase of liquid pilot fuel in step (j) with the second predetermined incremental change in the cylinder performance parameter established in step (i);

(l) repeating steps (j) and (k) so as to successively increase delivery of liquid pilot fuel to the selected cylinder until the change in the cylinder performance parameter is less than the second predetermined incremental change in such parameter established in step (i) at which point an amount of liquid pilot fuel being delivered to the selected cylinder is established as a desired amount;

(m) maintaining delivery of the desired amount of liquid pilot fuel established in step (l) to the selected cylinder; and (n) controlling the delivery of liquid pilot fuel to each of the remaining cylinders of the dual fuel engine in accordance with steps (a) through (m) for each successive cylinder.

2. The method, as set forth in claim 1, wherein the cylinder performance parameter is cylinder exhaust port temperature.

3. The method, as set forth in claim 1, wherein the cylinder performance parameter is cylinder pressure.

4. The method, as set forth in claim 1, wherein the first predetermined incremental amount of liquid pilot fuel established in step (c) is greater than the second predetermined incremental amount of liquid pilot fuel established in step (h).

5. The method, as set forth in claim 1, wherein the first predetermined incremental change in the cylinder performance parameter established in step (d) is greater than the second predetermined incremental change in the cylinder performance parameter established in step (i).

6. The method, as set forth in claim 1, wherein the desired amount of liquid pilot fuel being delivered to each selected cylinder in step (m) represents a minimum amount of liquid pilot fuel necessary for delivery to the selected cylinder to achieve optimal ignition and combustion of the air/gaseous fuel mixture within such cylinder.

7. The method, as set forth in claim 1, wherein a predetermined amount of liquid pilot fuel which is greater than the desired amount of liquid pilot fuel delivered to each respective cylinder as a result of step (m) is delivered to each respective cylinder in step (a).

8. The method, as set forth in claim 1, wherein each cylinder includes at least one associated gaseous fuel admission valve for delivering gaseous fuel to each such cylinder, each gaseous fuel admission valve being trimmed to a desired exhaust port temperature.

9. The method, as set forth in claim 8, wherein the trimming of the gaseous fuel admission valves to a desired exhaust port temperature includes the following steps:

(1) selecting a cylinder of the dual fuel engine;

(2) sensing the actual exhaust port temperature of the selected cylinder;

(3) comparing the actual exhaust port temperature of step (2) to a desired exhaust port temperature;

(4) determining a trim value based upon the comparison of step (3), said trim value being a gaseous fuel admission valve control signal duration adjustment factor;

(5) applying the trim value of step (4) to a determined gaseous fuel admission valve control signal duration for the selected cylinder to establish a trimmed controlled signal duration;

(6) delivering gaseous fuel to the selected cylinder utilizing a gaseous fuel admission valve control signal having the trimmed gaseous fuel admission valve control signal duration of step (5); and (7) controlling the delivery of gaseous fuel to each of the remaining cylinders of the dual fuel engine in accordance with steps (1) through (6) for each remaining cylinder.

10. The method, as set forth in claim 9, wherein the desired exhaust port temperature is an average exhaust port temperature for all of the cylinders of the dual fuel engine.

11. The method, as set forth in claim 9, wherein step (4) further includes limiting the trim value to a predetermined range so as to result in no more than a predetermined incremental change in the gaseous fuel admission valve control signal duration.

12. The method, as set forth in claim 1, wherein each cylinder includes an associated gaseous fuel admission valve for delivering gaseous fuel to such cylinder, the delivery of gaseous fuel to each cylinder of the dual fuel engine being controlled in accordance with the following steps prior to the execution of steps (b) through (n) of claim 1, said steps comprising:

(o) selecting a cylinder of the dual fuel engine;

(p) sensing the actual exhaust port temperature of the selected cylinder;

(q) comparing the actual exhaust port temperature of step (p) to a desired exhaust port temperature;

(r) determining a trim value based upon the comparison of step (q), said trim value being a gaseous fuel admission valve control signal duration adjustment factor;

(s) applying the trim value of step (r) to a determined gaseous fuel admission valve control signal duration for the selected cylinder to establish a trimmed controlled signal duration;

(t) delivering gaseous fuel to the selected cylinder utilizing a gaseous fuel admission valve control signal having the trimmed gaseous fuel admission valve control signal duration of step (s); and (u) controlling the delivery of gaseous fuel to each of the remaining cylinders of the dual fuel engine in accordance with steps (o) through (t) for each remaining cylinder.

13. A method for achieving minimum liquid pilot fuel delivery to each cylinder of a dual fuel engine operating in a dual fuel mode wherein each cylinder includes at least one controllable liquid fuel injector for delivering liquid pilot fuel to such cylinder and at least one controllable associated gaseous fuel admission valve for delivering gaseous fuel to such cylinder, the method comprising the steps of:

(a) delivering an amount of liquid pilot fuel to each cylinder so as to ensure sufficient combustion within each such cylinder;

(b) controlling the delivery of gaseous fuel to each cylinder by trimming the gaseous fuel admission valves to a desired exhaust port temperature;

(c) selecting a cylinder of the dual fuel engine;

(d) establishing a first predetermined incremental amount of liquid pilot fuel;

(e) establishing a first predetermined incremental change in exhaust port temperature for the selected cylinder;

(f) reducing delivery of liquid pilot fuel to the selected cylinder by the first predetermined incremental amount established in step (d);

(g) comparing a change in cylinder exhaust port temperature as a result of the incremental reduction of liquid pilot fuel in step (f) with the first predetermined incremental change in exhaust port temperature established in step (e);

(h) repeating steps (f) and (g) so as to successively reduce delivery of liquid pilot fuel to the selected cylinder until the change in exhaust port temperature is greater than the first predetermined incremental change in exhaust port temperature established in step (e);

(i) establishing a second predetermined incremental amount of liquid pilot fuel;

(j) establishing a second predetermined incremental change in exhaust port temperature for the selected cylinder;

(k) increasing delivery of liquid pilot fuel to the selected cylinder by the second predetermined incremental amount established in step (i);

(l) comparing a change in cylinder exhaust port temperature as a result of the incremental increase of liquid pilot fuel in step (k) with the second predetermined incremental change in exhaust port temperature established in step (j);

(m) repeating steps (k) and (l) so as to successively increase delivery of liquid pilot fuel to the selected cylinder until the change in exhaust port temperature is less than the second predetermined incremental change in exhaust port temperature established in step (j) at which point an amount of liquid pilot fuel being delivered to the selected cylinder is established as a desired amount;

(n) maintaining delivery of the desired amount of liquid pilot fuel established in step (m) to the selected cylinder; and (o) controlling the delivery of liquid pilot fuel to each of the remaining cylinders of the dual fuel engine in accordance with steps (c) through (n) for each successive cylinder.

14. The method, as set forth in claim 13, wherein step (b) further includes:

(p) selecting a cylinder of the dual fuel engine;

(q) sensing the actual exhaust port temperature of the selected cylinder;

(r) comparing the actual exhaust port temperature of step (q) to a desired exhaust port temperature;

(s) determining a trim value based upon the comparison of step (r), said trim value being a gaseous fuel admission valve control signal duration adjustment factor;

(t) applying the trim value of step (s) to a determined gaseous fuel admission valve control signal duration for the selected cylinder to establish a trimmed controlled signal duration;

(u) delivering gaseous fuel to the selected cylinder utilizing a gaseous fuel admission valve control signal having the trimmed gaseous fuel admission valve control signal duration of step (t); and (v) controlling the delivery of gaseous fuel to each of the remaining cylinders of the dual fuel engine in accordance with steps (p) through (u) for each remaining cylinder.

15. The method, as set forth in claim 14, wherein the desired exhaust port temperature is an average exhaust port temperature for all of the cylinders.

16. The method, as set forth in claim 14, wherein step (r) further includes limiting the trim value to a predetermined range so as to result in no more than a predetermined incremental change in the gaseous fuel admission valve control signal duration.

17. The method, as set forth in claim 13, wherein the amount of liquid pilot fuel delivered to each cylinder in step (a) is greater than the desired amount of liquid pilot fuel delivered to each respective cylinder as a result of step (n).

18. The method, as set forth in claim 13, wherein the first predetermined incremental amount of liquid pilot fuel established in step (d) is greater than the second predetermined incremental amount of liquid pilot fuel established in step (i).

19. The method, as set forth in claim 13, wherein the first predetermined incremental change in exhaust port temperature established in step (e) is greater than the second predetermined incremental change in exhaust port temperature established in step (j).

20. The method, as set forth in claim 13, wherein the desired amount of liquid pilot fuel being delivered to each selected cylinder in step (n) represents a minimum amount of liquid pilot fuel necessary for delivery to the selected cylinder to achieve optimal ignition and combustion of the air/gaseous fuel mixture within such cylinder.

* * * * *